US009107110B2

(12) United States Patent
Zdarsky et al.

(10) Patent No.: US 9,107,110 B2
(45) Date of Patent: Aug. 11, 2015

(54) APPARATUS AND METHOD FOR LOCAL MOBILITY MANAGEMENT IN A CLUSTERED FEMTOCELL NETWORK

(75) Inventors: Frank Zdarsky, Karlsruhe/Durlach (DE); Andreas Maeder, Heidelberg (DE); Sabah Al Sabea, Darmstadt (DE); Stefan Schmid, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 235 days.

(21) Appl. No.: 13/811,765

(22) PCT Filed: Aug. 9, 2010

(86) PCT No.: PCT/EP2010/004855
§ 371 (c)(1),
(2), (4) Date: Jan. 23, 2013

(87) PCT Pub. No.: WO2012/019615
PCT Pub. Date: Feb. 16, 2012

(65) Prior Publication Data
US 2013/0122911 A1 May 16, 2013

(51) Int. Cl.
*H04W 36/00* (2009.01)
*H04W 8/08* (2009.01)
*H04W 88/18* (2009.01)

(52) U.S. Cl.
CPC .......... *H04W 36/0005* (2013.01); *H04W 8/082* (2013.01); *H04W 36/00* (2013.01); *H04W 88/182* (2013.01)

(58) Field of Classification Search
CPC ............ H04W 8/082; H04W 36/0005; H04W 88/182; H04W 36/00
USPC .................................. 370/331; 455/436–444
See application file for complete search history.

(56) References Cited

U.S. PATENT DOCUMENTS

| 7,319,676 B2 | 1/2008 | Fujino |
| 2009/0316604 A1 | 12/2009 | Singh et al. |

FOREIGN PATENT DOCUMENTS

| JP | 2003259422 A | 9/2003 |
| JP | 2011526137 A | 9/2011 |
| WO | 2010/086014 A1 | 8/2010 |

OTHER PUBLICATIONS

Mitsubishi Electric: "EUTRAN Proxy in support of massive deployment of HNBs", 3GPP Draft; R3-080062 (HNB Proxy), 3rd Generation Partnership Project (3GPP), Mobile Competence Centre, 650, Route Des Lucioles, F-06921 Sophia-Antipolis Cedex, vol. RAN WG3, no. Sorrento, Italy; Feb. 5, 2008, XP050163296, [retrieved on Feb. 5, 2005] the whole document, Cited in ISR.

(Continued)

*Primary Examiner* — Charles Shedrick
(74) *Attorney, Agent, or Firm* — Young & Thompson

(57) ABSTRACT

A clustered femtocell network including a plurality of femtocell access points that are connected via a logical interface to a mobile network in order to provide user equipments with radio access to the mobile network, wherein the mobile network includes a Mobility Management Function—MMF—, is characterized in that a logical function—Proxy Mobility Management Function P-MMF—is provided that localizes mobility management of the user equipments in the clustered femtocell network, wherein the P-MMF intercepts and interprets mobility-related signaling between the MMF and the femtocell access points in such a way that it emulates towards the femtocell access points the behavior of the mobile network's MMF and towards the mobile network's MMF the behavior of the femtocell access points. Furthermore, a method for operating a clustered femtocell network is disclosed.

13 Claims, 3 Drawing Sheets

(56) References Cited

OTHER PUBLICATIONS

Nokia Si Emens Networks et al.: "Impact on S1AP from HeNB GW concept", 3GPP Draft; R3-080465, 3rd Generation Partnership Project (3GPP), Mobile Competence Centre ; 650, Route Des Lucioles ; F-06921 Sophia-Antipolis Cedex ; France, vol. RAN WG3, no. Sorrento, Italy; Feb. 18, 2008, XP050163662, [retrieved on Feb. 18, 2008] the whole document, Cited in ISR.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP Standard; 3GPP TS 36.300, 3rd Generation Partnership Project (3GPP), Mobile Competence Centre; 650, Route Des Lucioles ; F-06921 Sophia-Antipolis Cedex ; France, no. V8.10.0, Sep. 1, 2009, pp. 1-147, XP050377585, Ch. 4.6.1; p. 19.

International Search Report, dated Apr. 15, 2011, from corresponding PCT application.

APPARATUS AND METHOD FOR LOCAL MOBILITY MANAGEMENT IN A CLUSTERED FEMTOCELL NETWORK

BACKGROUND OF THE INVENTION

1. Field of the Invention

The present invention relates to a clustered femtocell network including a plurality of femtocell access points that are connected via a logical interface to a mobile network in order to provide user equipments with radio access to said mobile network, wherein said mobile network includes a Mobility Management Function—MMF—. Furthermore, the present invention relates to a method for operating such a clustered femtocell network.

2. Description of the Related Art

In the present application reference will be made to various documents containing technical specifications. For the sake of simplicity the documents are referenced as follows:

[1] 3GPP, "TS 36.300 V8.10.0; Evolved Universal Terrestrial Radio Access (E-UTRA) and Evolved Universal Terrestrial Radio Access Network (E-UTRAN); Overall description; Stage 2", September 2009

[2] 3GPP, "TS 23.401 V8.8.0; Technical Specification Group Services and System Aspects; General Packet Radio Service (GPRS) enhancements for Evolved Universal Terrestrial Radio Access Network (E-UTRAN) access", December 2009

[3] 3GPP, "TS 36.423 V9.0.0; Technical Specification Group Radio Access Network; Evolved Universal Terrestrial Radio Access Network (E-UTRAN); X2 Application Protocol (X2AP)", September 2009

[4] 3GPP, "TS 36.413 V9.0.0; Technical Specification Group Radio Access Network; Evolved Universal Terrestrial Radio Access Network (E-UTRAN); S1 Application Protocol (S1AP)", September 2009

[5] Soliman et al. Hierarchical Mobile IPv6 Mobility Management (HMIPv6). IETF RFC 4140.

[6] WiMAX Forum, "WMF-T32-001-R015v01; WiMAX Forum Network Architecture; Architecture Tenets, Reference Model and Reference Points; Base Specifications", November 2009

Femtocell Access Points (FAPs) are essentially small-scale versions of the (macro-cell) Base Stations (BSs) that provide User Equipments (UEs, e.g. mobile phones and Internet tablets) with radio access to a Mobile Network (MN). A distinguishing characteristic of FAPs is that—unlike the BSs—they are installed by the customers of a Mobile Network Operator (MNO) themselves and on their premises in a "plug-and-play" manner. However, although FAPs are deployed by the MNO's customers they are part of the MNO's Radio Access Network (RAN) and thus have similar requirements as the BSs. Specifically, all radio and mobility management related functions are under the control of the MNO and handled in a uniform manner to ensure radio co-existence between FAPs and BSs and also to enable user mobility between them.

To exchange user data and control data (e.g. signaling messages) between FAPs and the Mobile Network, FAPs are connected via a logical interface to the MN similar to the BSs. Physically, however, data from a MNO customer's FAP is sent over the customer's local network, then over the customer's backhaul link to the public Internet, and finally through the public Internet into the MN of the respective operator (and vice-versa). This increases the traffic load in the customer's network and in particular on the backhaul link, which is often a resource bottleneck. Furthermore, signaling messages experience an increased latency compared to the fast connections between BSs and the MN.

In many cases, each of the MNO's customers (e.g. a private household) will deploy only a single FAP. In the case of Clustered Femtocell Networks (CFNs), a large number of FAPs are deployed by an organization with the intention to build a mobile network which benefits from the Femtocell concept (i.e. higher throughput, better coverage, etc.), but at the same time uses proven, widely-used technologies such as 3GPP LTE or mobile WiMAX. A typical example of a Clustered Femtocell Network is an Enterprise Femtocell Network. Here, the Enterprise deploys an internal Femtocell network which is technically still under the control of a mobile network operator.

A CFN is likely deployed for a large number of mobile device users. This means that the rate of intra-FAP handovers of UEs (i.e. from one FAP of a CFN to another FAP of the same CFN), hand-ins (i.e. from the macro-cellular network to the CFN) and hand-outs (i.e. from the CFN to the macro-cellular network) is potentially high. Also, it is likely that a significant amount of voice or data traffic is local to the CFN, e.g. it is exchanged between UEs connected to FAPs of the same CFN.

In current MN architectures, user data between two local UEs would have to be sent via the respective mobility management function (MMF) of these UEs within the MN. It is understood that the general term "mobility management function" refers to the corresponding function within each specific technology, e.g. the SGSN in a 3GPP, the MME/S-GW in a 3GPP LTE [1,2] and the HO and DP Functions in a WiMAX architecture [6]. For the MMF being involved in the entire mobility management, the data needs to traverse the CFN's backhaul link and the public Internet twice: Once when sent from the CFN to the mobility management entity (-ies) in the MN and once on the way back. Similarly, whenever a handover occurs within the CFN, mobility management signaling messages need to be exchanged between the involved FAPs and the mobility management function within the MN.

Localized mobility management for CFNs is currently not foreseen in the MN architecture standards. A straight-forward approach to implementing a localized mobility management would be to take a hierarchical approach (e.g. similar to [5]), in which the mobility anchor point in the MN is responsible for handling mobility between the macro-cellular network and the CFN(s) and in which each CFN would have a subordinate local mobility anchor point for handling local mobility. However, this would require the introduction of a new interface between the mobility anchor points of the MN and CFN levels as well as changes to the implementation of the MN-level mobility anchor, which would have to deal with both BSs, single FAPs and CFN mobility anchors concurrently.

As current MN architectures support a "re-selection" of a UE's mobility anchor point, another approach would be to place a regular mobility anchor point into each CFN. Hand-ins and hand-outs would then be implemented via a re-selection between peer mobility anchor points. The disadvantage of this approach is that the interface between mobility anchor points is not secured, because it is assumed that it is an interface internal to the MNO and not exposed to but the most trusted clients (if at all).

Furthermore, state of the art solutions provide localized mobility management for picocells or UMA (Unlicensed Mobile Access) by locally implementing a complete Radio Access Network that is integrated into the MNO's network. As picocells are completely owned and operated by the MNO, this does not create security issues, but requires a significantly deep integration with the MN and involves a non-negligible overhead for provisioning by the MNO. Consequently, such solutions are offered by the MNO to its largest customers, at the most.

All approaches described above would mean significant changes to the current architecture.

BRIEF SUMMARY OF THE INVENTION

It is therefore an object of the present invention to improve and further develop a clustered femtocell network of the initially described type and a method for operating such network in such a way that handovers between FAPs of a CFN are enabled with minimal amount of signaling to the MN over the CFN's backhaul connection and that no changes to the mobility-related interfaces and procedures in the MN are required.

In accordance with the invention, the aforementioned object is accomplished by a clustered femtocell network. According to this claim, such a method is characterized in that a logical function—Proxy Mobility Management Function P-MMF—is provided that enables local mobility management of said user equipments in said clustered femtocell network, wherein said P-MMF intercepts and interprets mobility-related signaling between said MMF and said femtocell access points in such a way that it emulates towards said femtocell access points the behavior of said mobile network's MMF and towards said mobile network's MMF the behavior of said femtocell access points.

Furthermore, the above mentioned object is accomplished by a method for operating a clustered femtocell network. According to this claim, such a method is characterized in that a logical function—Proxy Mobility Management Function P-MMF—is provided that enables local mobility management of said user equipments in said clustered femtocell network, wherein said P-MMF intercepts and interprets mobility-related signaling between said MMF and said femtocell access points in such a way that it emulates towards said femtocell access points the behavior of said mobile network's MMF and towards said mobile network's MMF the behavior of said femtocell access points.

According to the invention it has been recognized that a reduction of the user and control data load on the backhaul as well as the latency of data forwarding can be achieved by localizing mobility management ("localized mobility management"), i.e. by handling local mobility locally and by forwarding local data traffic locally. Furthermore, it has been recognized that enabling a localized mobility management requires some form of mobility anchor inside the Clustered Femtocell Network (CFN). Finally, it has been recognized that in order to keep the necessary changes to the current architecture as low as possible and in order not to require modifications of neither the MN's Mobility Management Function (MMF) nor the CFN's FAPs and in particular the logical interface between them (e.g. the S1 interface in an LTE architecture [4]), it is necessary that the MN's MMF still "believes" it is directly connected to the FAPs of the CFN and the latter are still directly connected to the MMF.

According to the present invention this is achieved through the introduction of a new logical function inside the CFN, termed "Proxy MMF" or "P-MMF". Preferably, the P-MMF is inserted into the logical interlace between the CFN's FAPs and the mobile network's MMF and localizes mobility within the CFN. To do so, it intercepts and interprets mobility-related signaling messages between the MN's MMF and the FAP in such a way that it emulates towards the femtocell access points the behavior of the mobile network's MMF, in particular in terms of handling inter-FAP handovers of the attached UEs. This means that the mobility management is made transparent and hidden from the mobile network's MMF.

As a result, the present invention achieves reduced mobility related signaling over the backhaul connection between enterprise and mobile operator network and an optimized performance of mobility related functions in the enterprise network domain.

In practice, there may be additional network functions "between" the MN's MMF and the CFN's FAPs, namely FAP and Security Gateways. However, these perform additional, not mobility-related functions and are transparent with respect to the relationship between MMF and FAPs. In the description of the present invention they are therefore left-out for simplification.

By introducing a Proxy Mobility Management Function according to the present invention, support for localized mobility management in CFNs is provided without the need of treating the CFN as a complete RAN of the MN. Furthermore, by the P-MMF appropriately modifying mobility-related messages, standard interfaces of the femtocell sub-system of mobile network architecture can be reused. Moreover, the present invention is applicable for femtocell networks in all kind of mobile broadband networks, in particular in 3GPP and Mobile WiMAX environments, and it has a standard conformant design for 3GPP Release 8 and beyond.

According to a preferred embodiment the P-MMF may be configured to selectively forward and/or generate appropriately modified signaling messages such that the mobile network's MMF "believes" that a UE remains attached to the same FAP. In other words, the P-MMF modifies signaling messages in such a way that the mobile network's MMF is not aware of any UE movements within the clustered femtocell network at all. Such a "hiding of mobility" by the P-MMF can be done for all or only selected handovers among femtocell access points of the clustered femtocell network and for all or only selected UEs.

In this regard it is important to note that the provision of a P-MMF, which localizes mobility within the clustered femtocell network by performing the above mentioned steps, has to be distinguished from a hierarchical mobility approach according to which a MMF would "consciously" delegate mobility management functionality to a lower-level MMF responsible for a certain region. In such case a higher level MMF would only know the next lower-level MMF of a UE, but it would not know the femtocell access point a UE is attached to.

Once the localized mobility management is enabled by introducing the P-MMF, according to an even more sophisticated approach it may be provided that the P-MMF uses its own algorithms for optimizing mobility within the clustered femtocell network. For instance, the P-MMF may carry out its own algorithms with respect to load balancing, UE location tracking, and/or power saving optimizations. Applying own algorithms comes along with the advantage of being able to perform actions that are as widely as possibly adapted to the specific needs of the clustered femtocell network.

According to anther preferred embodiment, in case a UE initially attaches to a femotcell access point inside the clustered femtocell network (which in the following is referred to as initial femtocell access point), i.e. for instance when a UE is initially handed-in from an external base station, it may be provided that the P-MMF is configured to let the handover-related signaling messages between the mobile network's MMF and the initial femtocell access point pass as normal without making any modifications thereto. The P-MMF may just create or update state information for that UE. However, if the UE later hands over to other femtocell access points inside the same clustered femtocell network, the P-MMF may—as describe above—"hide" these handovers from the mobile network's MMF. As a consequence, the state information that the MMF and the P-MMF have on a UE will differ, unless the UE returns to its initial femtocell access point at a later point in time.

There are situations in which a UE is not currently attached to its initial femtocell access point, e.g. after having performed a first handover after the initial hand-in, but its current femtocell access point needs to exchange signaling messages with the mobile network's MMF that can not be hidden by the P-MMF. A typical example would be the set-up or tear-down of a now communication session or "bearer". In such a case the P-MMF may modify handover-related signaling messages by replacing the UE's current femtocell access point with the initial femtocell access point, and vice versa.

According to another embodiment it may be provided that the P-MMF, in case a UE is not attached to its initial femtocell access point (i.e. the one that was selected e.g. upon handover to the femtocell network or upon initial attachment), performs a re-synchronization of the UE's state information with the mobile network's MMF resulting, e.g., in that the current femtocell access point becomes the new initial femtocell access point. Such re-synchronization may be carried out in particular in situations in which it is required that the signaling received by the MMF contains information on the actual femtocell access points that a UE is attached to. For instance, this may be required in cases of handing out a UE from the clustered femtocell network to a base station in the mobile network. Depending on the MMF's software implementation, the P-MMF could either simply let the signaling messages with the information on the actual femtocell access point pass unmodified, or it may perform the above-mentioned re-synchronization of the state information between MMF and P-MMF beforehand. In order to re-synchronize states, the P-MMF may send signaling messages that emulate a handover from the initial femtocell access point to the actual femtocell access points towards the MMF.

In connection with a further embodiment of the present invention, the case of optimized handover signaling between BSs and FAPs is additionally taken into consideration. In this context it is important to keep in mind that in order to prepare and execute a handover, signaling messages need to be exchanged between a UE's current BS and one or more other BS (the "candidate BS" or the finally selected "target BS"). In the non-optimized case, these messages are exchanged indirectly via the MN's MMF (i.e., via the S1 interface in an LTE access [4], or the R6 interface in WiMAX [6]). In the optimized case, they are exchanged directly between the involved BSs (i.e., via the X2 interface in an LTE access [3], or the R8 interface in WiMAX [6]) and only the result is communicated to the MN's MMF. This optimized handover case is currently not defined for handovers between FAPs.

To nevertheless optimize handovers from, to or between CFNs, a P-MMF could be extended to translate between the respective signaling messages. For example, in the case of LTE, it could to the outside of a CFN (i.e. to the MMF and neighboring BSs or CFNs) appear like a set of BSs that support X2 handover signaling messages and translate these messages to/from the S1 handover signaling messages used inside the CFN for communication between FAPs.

So far, it has only been described how the P-MMF handles the mobility-related signaling messages (the "control plane") to localize mobility. Advantageously, in order to support seamless data exchange, it may be provided that the P-MMF includes a function that also redirects the actual data traffic ("data plane") from the MN to the current FAP of a UE, if necessary, and vice versa for traffic from the UE to the MN. This function could be integrated into the P-MMF or a separate function. For instance in case of LTE access, the additional P-MMF may be implemented within a new element called Proxy Mobility Management Entity (Proxy MME). It may be supported with another element, the Proxy Serving Gateway (Proxy S-GW), to redirect the actual data traffic from the MN to the current FAP of a UE.

According to an embodiment of the present invention, the P-MMF including said traffic redirection function may be configured to localize the data traffic sent from one FAP to another FAP of the same CFN, i.e. without sending the traffic first to the MN where it would then be sent back to the CFN and would thus traverse the backhaul between the two networks twice. To localize the traffic forwarding (and to optimize the routing, the P-MMF would intercept traffic sent from one FAP and ultimately destined to another FAP of the same CFN on the way to the MN and immediately redirect it to the destination FAP. Similarly, the P-MMF could act as the "local breakout" point for accessing the local IP network (Local IP Access or LIPA) or for Selected IP Traffic Off-loading (SIPTO) to the Internet.

For resilience and load balancing reasons, the present local mobility management solution could be extended to support multiple P-MMFs within a CFN and/or associating one P-MMF with multiple MMF inside the MN. In particular, multiple P-MMFs may be provided, wherein each P-MMF is associated with a MMF inside the MN.

According to a further embodiment of the present invention the Proxy MMF could also be used for localized mobility management within clusters of BS inside the MN itself.

BRIEF DESCRIPTION OF THE DRAWINGS

There are several ways how to design and further develop the teaching of the present invention in an advantageous way. To this end, it is to be referred to the patent claims and to the following explanation of preferred embodiments of the invention by way of example, illustrated by the figures. In connection with the explanation of the preferred embodiments of the invention by the aid of the figures, generally preferred embodiments and further developments of the teaching will we explained. In the drawings:

DETAILED DESCRIPTION OF THE PREFERRED EMBODIMENTS

Figure 1:
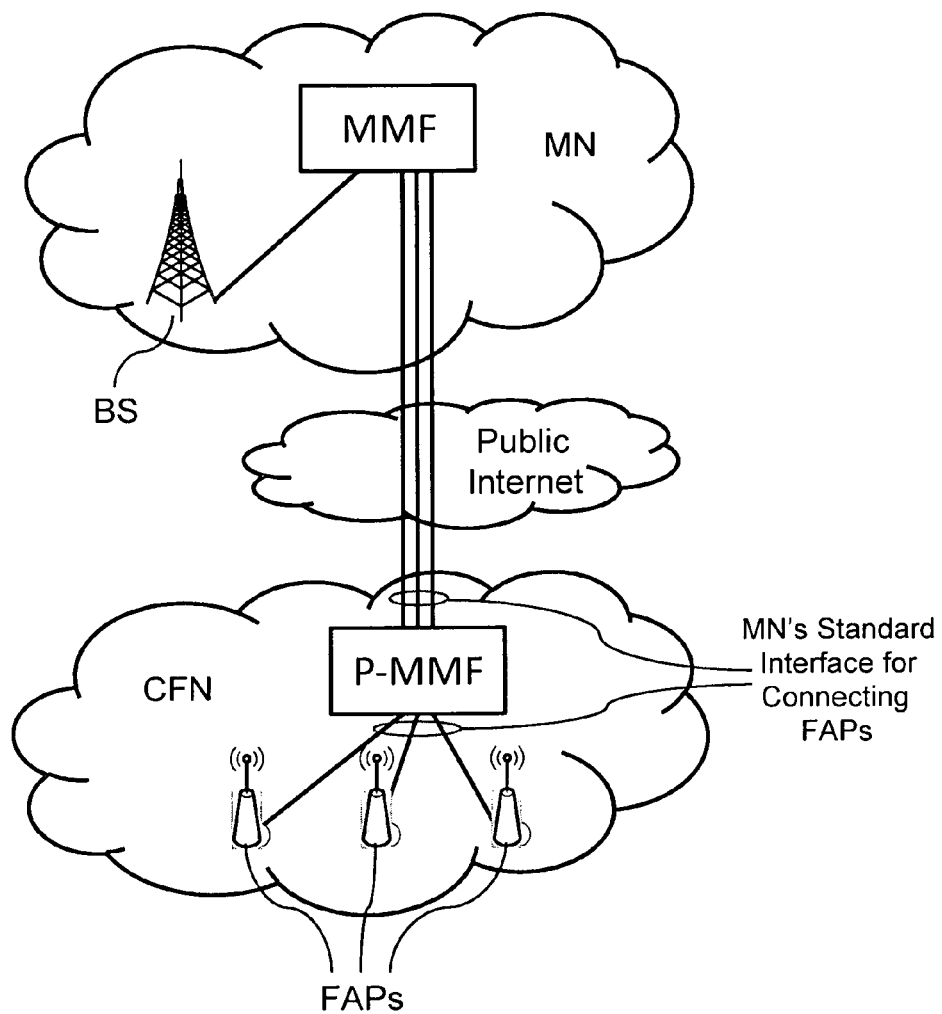
FIG. 1 is a schematic view illustrating how a Proxy Mobility Management Function in an architecture of a clustered femtocell network being under the control of the operator of a mobile network would be inserted into the standard interface between the mobile network's MMF and the CFN's FAPs.

FIG. 1 schematically illustrates an architecture of a clustered femtocell network CFN that is under the control of the operator of a mobile network MN. The CFN includes a plurality of femtocell access points FAPs that are connected via the Public Internet to a Mobility Management Function MMF of the MN. The MMF is configured to exchange signaling messages with the base stations BSs (only one of which is depicted in FIG. 1) in order to realize mobility management of associated user equipments UEs.

According to the present invention, a logical function—Proxy Mobility Management Function P-MMF—is provided inside the CFN. The P-MMF includes MN's standard interfaces for connecting the FAPs of the CFN to the MN. The P-MMF is configured to localize mobility of UEs in the CFN, wherein the P-MMF intercepts and interprets mobility-related signaling between the MMF and the FAPs and selectively forwards and/or generates appropriately modified signaling messages. To do so, it intercepts and interprets mobility-related signaling between the MN's MMF and the FAPs, and then towards the CFN's FAPs emulates the behavior of the MN's MMF in terms of handling inter-FAP handovers of attached User Equipments (UEs), while towards the MN's MMF it selectively forwards (or generates) appropriately modified signaling messages such that the MMF "believes" a UE remains attached to the same FAP (i.e. it is not moving at all).

In other words, the P-MMF hides CFN internal UE mobility from the MMF in the MN. As a result of enabling the localized mobility management by means of the P-MMF introduction, the signaling overhead between the CFN and the MN over the potentially expensive (in terms of cost and resources) backhaul connection between the two networks and the Internet is significantly reduced. Also, the P-MMF can use its own algorithms for optimizing mobility within the CFN (i.e. load balancing, UE location tracking or power saving optimizations) adapted to the specific needs of the CFN. Furthermore, information about UE mobility in the CFN is "hidden" from the MN, thereby increasing information privacy.

Figure 2:
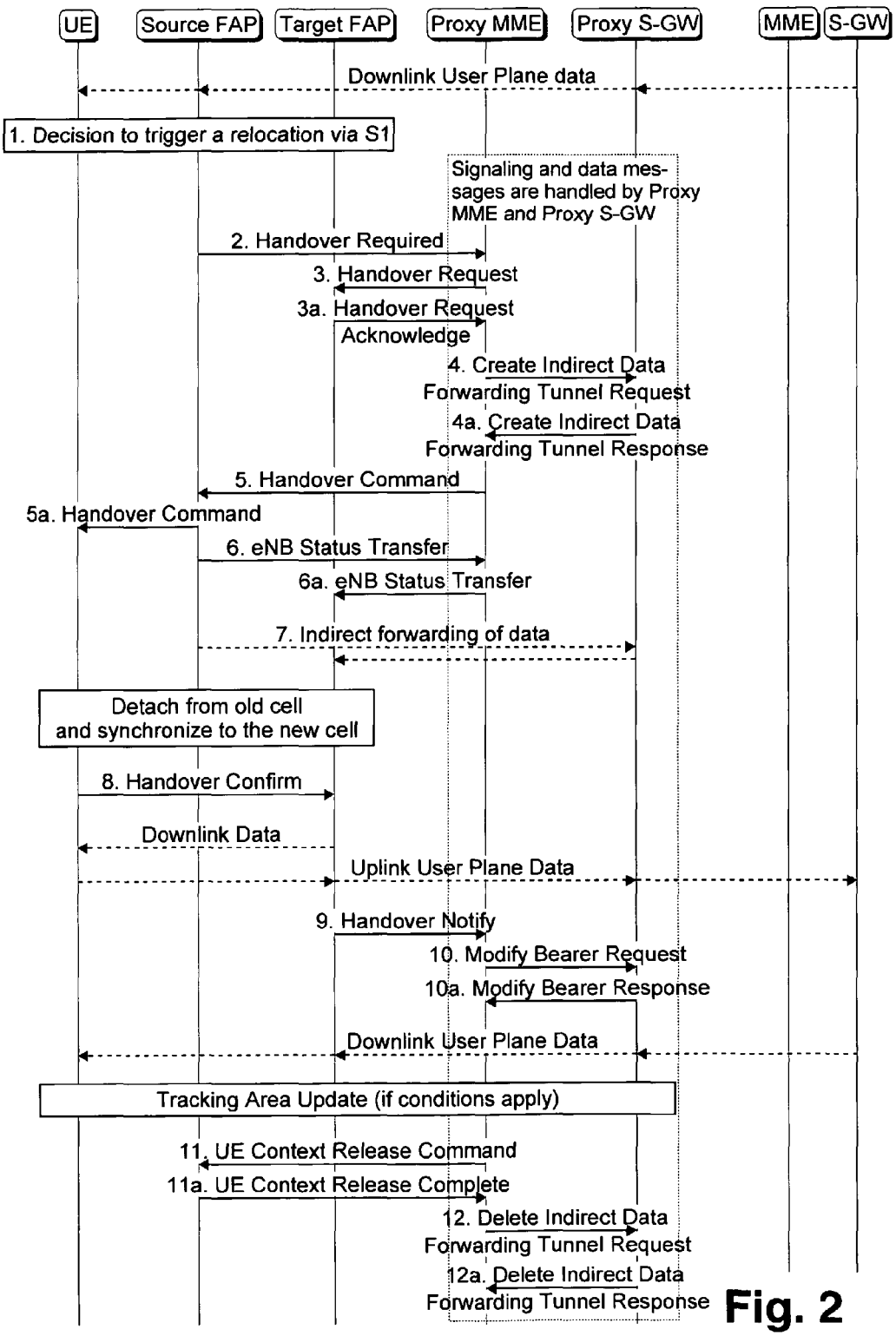
FIG. 2 is a schematic view illustrating the message flow of a handover between two femtocell access points of a clustered femtocell network according to an embodiment of the present invention.
Figure 3:
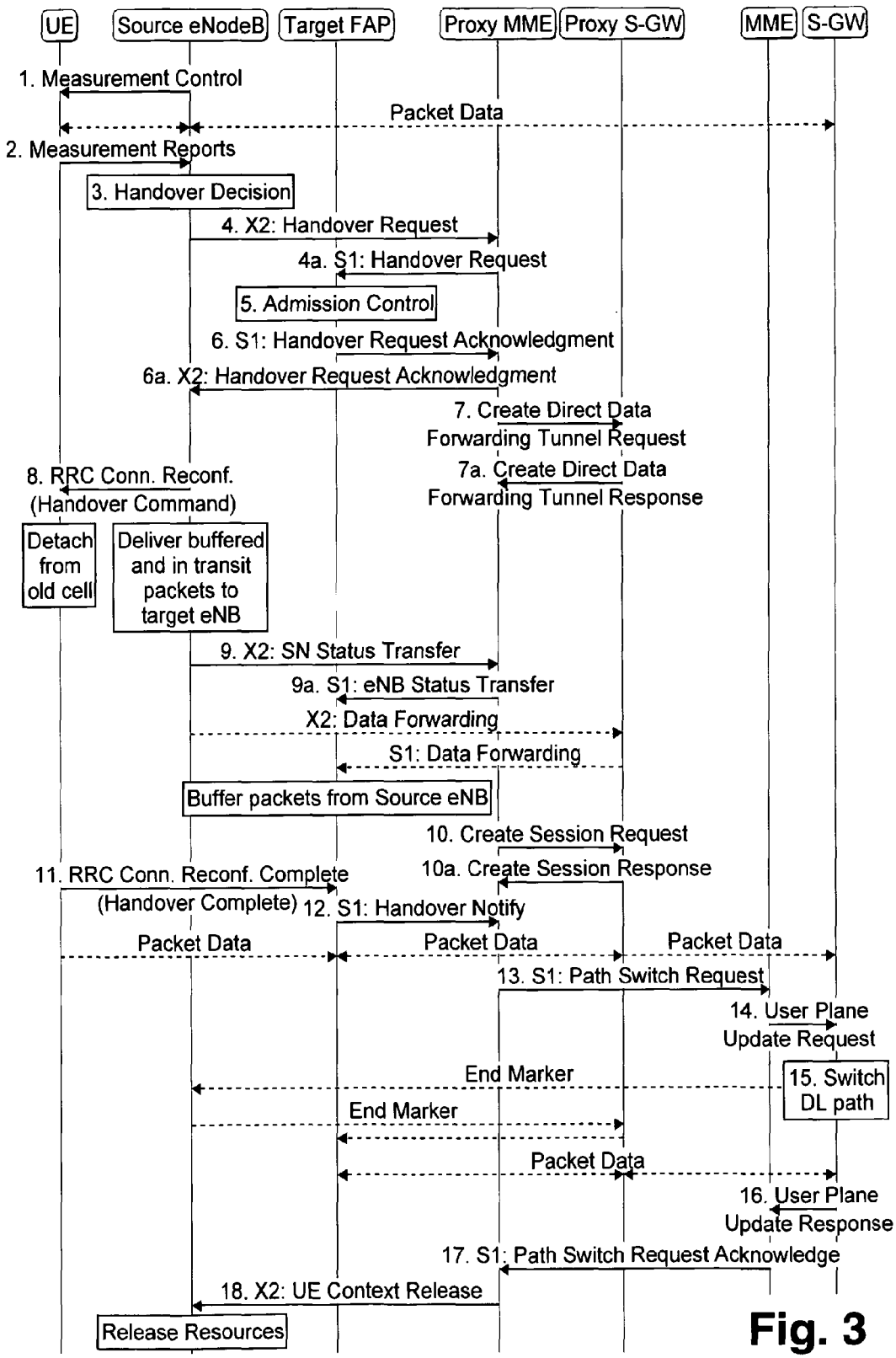
FIG. 3 is a schematic view illustrating the message flow of a hand-in from a mobile network to a femtocell access point of a clustered femtocell network according to another embodiment of the present invention.

Exemplarily, two embodiment of the present invention are illustrated in FIGS. 2 and 3. FIG. 2 illustrates the message flow of an inter-FAP (femtocell access point) handover, i.e. a handover performed between two FAPs within the clustered femtocell network CFN in case of 3GPP LTE (Long Term Evolution) access. FIG. 3 illustrates the message flow of a hand-in from the mobile network MN to a FAP within the CFN, also in case of LTE access. The illustrated hand-in is performed in an optimized fashion in that it is executed directly between the involved base stations BSs).

In connection with the embodiments of FIGS. 2 and 3 it is to be noted that for LTE access, the P-MMF that is provided according to the present invention is implemented within a new element called Proxy MME (Proxy Mobility Management Entity). The Proxy MME is supported with another element, the Proxy S-GW (Proxy Serving Gateway), to redirect the actual data traffic from the MN to the current FAP of a UE.

As mentioned above, FIG. 2 shows the message flow of inter-FAP handover. The illustrated embodiment is a modified version of the S1-based handover explained in [2]. Following the specification of the S1-based handover, in the illustrated embodiment it is also considered that MME and S-GW are not relocated.

Before a handover of the UE is decided, user plane data is exchanged between the source FAP (which is the femtocell access point of a CFN the UE is currently attached to) and the Serving Gateway (S-GW) via the Proxy S-GW over pre-established tunnels. The S-GW is part of the MN whose operator has control of the CFN.

After a decision to handover is taken (step 1), the source FAP sends a "Handover Required" message (step 2) to the MME, which is, however, intercepted by the Proxy MME. This is in contrast to prior art local mobility management solutions according to which the source FAP would explicitly send such message to a local MME instead. It is as well in contrast to prior art non-local mobility management solutions according to which the message would be sent via the backhaul link to the MME without being intercepted. The Proxy MME interprets the content of the "Handover Required" message and recognizes that the target FAP is part of the CFN it controls. It therefore does not forward the message to the mobile network's MME, but generates a "Handover Request" message, which it sends on behalf of the MME to the target FAP (step 3). The target FAP performs the usual admission control and sends a "Handover Request Acknowledge" message to the MME, which is again intercepted by the MME.

To avoid data loss, it is common to forward downlink data received while the handover is in progress from the source to the target FAP. Since there is no direct forwarding of data—in this context it is important to note that the X2 interface between FAPs is still not defined in the standard specifications—, the creation of an indirect data forwarding tunnel is now mandatory. Normally, this indirect data forwarding would take place via the mobile network's S-GW. However, the Proxy MME optimizes this forwarding by instructing the Proxy S-GW, through which data from/to the S-GW has to pass, to immediately forward to the target FAP, rather than going via the mobile network. To do so, "Create Indirect Data Forwarding Tunnel Request/Response" messages are exchanged between the Proxy MME and the Proxy S-GW (steps 4 and 4a).

In steps 5 and 5a, a "Handover Command" message is generated by the Proxy MME and sent on behalf of the MME to the source FAP and then to the UE to command the UE to switch to the new cell. However, before detaching from the source FAP and synchronizing to the new one, the source FAP sends an "eNB Status Transfer" message (steps 6 and 6a) to the target FAP via the MME, again intercepted and processed by the Proxy MME.

In step 7, only indirect forwarding of downlink data from the source FAP to the target FAP via Proxy S-GW (instead of the S-GW) takes place. Direct forwarding is still not possible due to lack of an X2 interface between the source and the target FAP. At the target FAP the forwarded downlink data is buffered. As a further optimization, the Proxy S-GW could immediately redirect incoming downlink data from the S-GW to the target FAP, so that only few data packets need to take the indirect route via the source FAP.

After detaching from the old cell and synchronizing to the new cell, the UE confirms the handover (step 8). The target FAP is now able to send the buffered downlink data to the UE and to receive uplink data from it to be transferred to the S-GW via the Proxy S-GW. As MME and S-GW are not aware of the handover, the Proxy S-GW should rewrite uplink user data packets so that they appear to be still coming from the source FAP.

In step 9, the "Handover Notify" message is sent by the target FAP to the MME and intercepted by the Proxy MME. At this point it is again important to note that in prior art solutions this message would be sent to and received by the MN's MME (in the case without local mobility management) or explicitly sent to the local MME (in the case with local mobility management). After this notification, the Proxy MME exchanges messages, as illustrated in step 10, with the Proxy S-GW to modify the bearers to forward downlink user plane data to target FAP and not the source FAP.

At this moment, after switching the downlink path to a more direct one, which is from the target FAP to the S-GW via the Proxy S-GW (and no more via the source FAP), the handover procedure is completed.

In steps 11 and 12, the Proxy MME exchanges messages with the source FAP and with the Proxy S-GW to release the UE-related resources and the tunnel used for indirect data forwarding. It is to be noted that from the point of view of the MME and S-GW, the UE is still attached to the source FAP and the Proxy MME and Proxy S-GW continue to translate signaling and data messages accordingly.

FIG. 3 shows the message flow of an X2-based hand-in of a UE to a target FAP of a CFN. In the illustrated embodiment, the Proxy MME is the terminating entity of the X2-interface towards the source eNB (evolved Node B) and of the S1-interface towards the target FAP. Since the Proxy MME is connected to the FAPs via an S1 interface, it must translate X2AP messages to S1 AP messages and vice versa, thus ensuring that the internal state machines both in the target FAP as well as in the source eNB stay in a defined state. Thus, X2-based hand-in is a combination of S1-based [2] and X2-based handover [1].

Before the handover is decided, the user data is transmitted between the UE and the S-GW through the source eNB. The UE regularly measures the strength of the signals received using the "Measurement Control" message (step 1) and sends the result to the source eNB using "Measurement Reports" (step 2). Based on these results, a handover to a FAP is decided (step 3), e.g. because the signal strength the UE receives from the source eNB decreased below a predefined critical threshold.

In step 4, the source eNB sends an X2AP-based "Handover Request" message over the newly introduced X2 interface to the Proxy MME pretending to be a regular eNB. The Proxy MME then translates this message to an S1AP-based "Handover Request" and sends it to the target FAP over the S1 interface.

Message translation is to make an X2AP message well-matched with the corresponding S1AP message and vice versa. This is achieved by filling the corresponding message with the required Information Elements (IE). In most cases, the required IEs can be found in the previous message. However, if the IE is not found, ex. case of "eNB UE X2AP ID" and "MME UE S1AP ID", the Proxy MME can solve this problem by creating a mapping between the IEs and then inserting the correct IE in the correct message.

In step 5, the target FAP performs the "Admission Control" according to the received E-RAB QoS information. In step 6, the target FAP acknowledges the handover by sending the "Handover Request Acknowledgment" over the S1 interface. This message is then translated to the correspondent X2AP message and sent on the X2 interface to the Source eNB. These messages must contain a transparent container of necessary information to be sent to the UE, as an RRC (Radio Resource Control) message, to perform the handover (as described in [1]).

In step 7, the Proxy MME exchanges "Create Direct Data Forwarding Tunnel Request/Response" messages with the Proxy S-GW to create tunnels needed to directly forward some buffered data later.

When the source eNB receives the handover acknowledgment, it takes the necessary information from the transparent container and performs some necessary integrity protection and ciphering of the message [1] before sending it to the UE. This is shown by the "RRC Connection Reconfiguration" or the "Handover Command" message in step 8.

Upon receiving this message, the UE detaches from the old cell and begins synchronization to the FAP. The source eNB also delivers the buffered and in transit packets to the target FAP via the proxy S-GW.

In step 9, "SN Status Transfer" message is sent from the source eNB to the Proxy MME over the X2 interface. It is then translated into "eNB Status Transfer message" and sent to the target FAP over the S1 interface. These messages are used to convey both uplink and downlink PDCP SN status of E-RAB for which PDCP status preservation applies, e.g. in order to guarantee in-sequence delivery of data packets.

The source eNB is now able to forward the buffered data to the Proxy S-GW over the X2 interface. The Proxy S-GW forwards these data to the target FAP where they are buffered to be delivered to the UE when the synchronization process has successfully finished.

In steps 10/10a, the Proxy MME exchanges "Create Session Request/Response" messages to create a tunnel between the target FAP and the Proxy S-GW, to carry data packets after the handover is completed.

After synchronization with the new cell is successful, the UE sends "RRC Connection Reconfiguration Complete" or "Handover Complete" (in step 11) together with an uplink Buffer Status Report to the target FAP to confirm that handover is completed.

In step 12, the target FAP sends "Handover Notify" message to the MME over the S1 interface, which is intercepted by the Proxy MME.

At this moment, data can be transferred in the uplink directly between the UE and the target FAP to the S-GW via the Proxy S-GW. For the downlink data, it is still forwarded via the source eNB to the Proxy S-GW to the target FAP before reaching the UE. Note that the buffered data in the target FAP are now forwarded to the UE.

To complete the handover, downlink data should not pass through the source eNB. Thus, the Proxy MME sends a "Path Switch Request" (step 13) on behalf of the target FAP to the MME to inform it that the UE has changed cell.

In step 14, the MME sends a "User Plane Update Request" message to the S-GW to create a direct tunnel between the S-GW and the Proxy S-GW to carry the exchanged data after the path is switched.

In step 15, the S-GW switches the downlink path to the target FAP directly. It also sends one or several "end marker" packets on the old path to the source eNB before releasing resources towards source eNB [1].

Now both the uplink and downlink data are exchanged between the S-GW and the target FAP via the Proxy SGW only and not the source eNB.

In steps 16 and 17, "User Plane Update Response" and "Path switch Response" are sent back.

In step 18, the Proxy MME sends a "UE Context Release" to the source eNB to release all the resources related to this UE.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A clustered femtocell network, comprising:
a plurality of femtocell access points that are connected via a logical interface to a mobile network in order to provide user equipment with radio access to said mobile network, the user equipment being configured to perform handovers between the femtocell access points,
wherein said mobile network includes a Mobility Management Function (MMF) and
a logical function, which is a Proxy Mobility Management Function (P-MMF), is provided that enables local mobility management of said user equipment in said clustered femtocell network, the P-MMF hides the handovers from the MMF by intercepting and interpreting mobility-related signaling between said MMF and said femtocell access points such that the P-MMF emulates towards said femtocell access points the behavior of the MMF of said mobile network in handling the handovers and towards the MMF of said mobile network the behavior of said femtocell access points such that there is no indication to the MMF that the user equipment does not remain attached to the same femtocell access point.

2. The network according to claim 1, wherein said P-MMF is configured to selectively forward and/or generate appropriately modified signaling messages towards said mobile network's MMF.

3. The network according to claim 1, wherein said P-MMF performs actions on the basis of its own algorithms for optimizing mobility within said clustered femtocell network.

4. The network according to claim 1, wherein said P-MMF, when a user equipment initially attaches to a femtocell access point inside said clustered femtocell network, is configured to let handover-related signaling between said MMF and the initial femtocell access point pass without modifications.

5. The network according to claim 1, wherein said P-MMF, when a user equipment is not attached to the initial femtocell access point modifies outgoing signaling messages to the mobile network by replacing said user equipment's current femtocell access point with said initial femtocell access point and vice versa for incoming signaling messages from the mobile network.

6. The network according to claim 1, wherein said P-MMF, when a user equipment is not attached to its initial femtocell access point, performs a re-synchronization of said user equipment's state information with said MMF.

7. The network according to claim 6, wherein said P-MMF performs said re-synchronization by emulating towards said MMF a handover from said user equipment's initial femtocell access point to its current femtocell access point.

8. The network according to claim 1, wherein said P-MMF includes a function that redirects data and/or user plane traffic from said mobile network to the current femtocell access point of a user equipment.

9. The network according to claim 8, wherein said P-MMF additionally includes a function that rewrites data and/or user plane traffic from the current femtocell access point of said user equipment to said mobile network such that it appears to come from the user equipment's initial femtocell access point.

10. The network according to claim 8, wherein said P-MMF, for said redirection of data traffic, is implemented with a Proxy Mobility Management Entity that is supported by a Proxy Serving Gateway.

11. The network according to claim 8, wherein said P-MMF intercepts traffic sent from one femtocell access point of said clustered femtocell network to another femtocell access point of said clustered femtocell network and localizes the traffic handling.

12. The network according to claim 1, wherein multiple P-MMFs are provided, each P-MMF being associated with one or more MMF inside said mobile network.

13. A method for operating a clustered femtocell network, the method comprising:
providing a logical function that is a Proxy Mobility Management Function (P-MMF) that enables local mobility management of user equipment in said clustered femtocell network that includes a plurality of femtocell access points that are connected via a logical interface to a mobile network in order to provide the user equipment with radio access to the mobile network that includes a Mobility Management Function, the user equipment being configured to perform handovers between the femtocell access points, said P-MMF hiding the handovers from the MMF by intercepting and interpreting mobility-related signaling between said MMF and said femtocell access points such that the P-MMF emulates towards said femtocell access points the behavior of the MMF of said mobile network in handling the handovers and towards the MMF of said mobile network the behavior of said femtocell access points such that there is no indication to the MMF that the user equipment does not remain attached to the same femtocell access point.

* * * * *